(12) United States Patent
Quan et al.

(10) Patent No.: US 8,115,603 B2
(45) Date of Patent: Feb. 14, 2012

(54) METHOD FOR IDENTIFYING MULTIPLE MOVING TAGS WITH MULTIPLE READERS

(75) Inventors: Cheng Hao Quan, Yanji (CN); Hee-Sook Mo, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1236 days.

(21) Appl. No.: 11/828,703

(22) Filed: Jul. 26, 2007

(65) Prior Publication Data

US 2008/0024275 A1    Jan. 31, 2008

(30) Foreign Application Priority Data

Jul. 26, 2006   (KR) .................. 10-2006-0070416
Jul. 11, 2007   (KR) .................. 10-2007-0069613

(51) Int. Cl.
H04Q 5/22     (2006.01)
G05B 19/00    (2006.01)
H04W 24/00    (2009.01)
H04B 7/00     (2006.01)
H04B 1/56     (2006.01)
H04B 7/204    (2006.01)
H04L 12/28    (2006.01)

(52) U.S. Cl. .................. 340/10.32; 340/10.1; 340/10.2; 340/5.61; 340/5.62; 340/5.63; 455/456.1; 455/519; 370/276; 370/319; 370/431

(58) Field of Classification Search ........................ None
See application file for complete search history.

(56) References Cited

U.S. PATENT DOCUMENTS 5,995,019 A  * 11/1999  Chieu et al. ................ 340/10.32
6,040,774 A     3/2000  Schepps
6,377,203 B1    4/2002  Doany
(Continued)

FOREIGN PATENT DOCUMENTS

KR   10-2000-0057421   9/2000
KR   10-2006-0043829   5/2006
KR   1020070048071    5/2007

OTHER PUBLICATIONS

Jae-Ryong Cha; Jae-Hyun Kim; , "Novel Anti-collision Algorithms for Fast Object Identification in RFID System," Parallel and Distributed Systems, 2005. Proceedings. 11th International Conference on , vol. 2, pp. 63-67, Jul. 22-22, 2005.*

(Continued)

*Primary Examiner* — George Bugg
*Assistant Examiner* — Renee Dorsey
(74) *Attorney, Agent, or Firm* — H.C. Park & Associates, PLC

(57) ABSTRACT

Disclosed is a method for identifying a plurality of moving tags by using a plurality of Radio Frequency Identification (RFID) readers. The technology of the present invention efficiently identifies multiple moving tags to thereby improve the identification rate and reading speed of an RFID system and increase the throughput of the RFID system. The method for identifying a plurality of moving tags by using a plurality of Radio Frequency Identification (RFID) readers includes the steps of: a) grouping the multiple tags into a predetermined number of tag groups; b) allocating the tag groups to the RFID readers respectively; and c) identifying tags of each allocated tag group in each RFID reader.

6 Claims, 2 Drawing Sheets

U.S. PATENT DOCUMENTS

| | | | |
|---|---|---|---|
| 2005/0088284 A1* | 4/2005 | Zai et al. | 340/10.2 |
| 2006/0077039 A1* | 4/2006 | Ibi et al. | 340/10.1 |
| 2006/0170565 A1* | 8/2006 | Husak et al. | 340/825.49 |
| 2006/0192655 A1* | 8/2006 | Levin | 340/10.2 |
| 2007/0096877 A1* | 5/2007 | Quan et al. | 340/10.2 |
| 2007/0119932 A1* | 5/2007 | Sugano et al. | 235/451 |

OTHER PUBLICATIONS

Vogt, H.; , "Multiple object identification with passive RFID tags," Systems, Man and Cybernetics, 2002 IEEE International Conference on , vol. 3, pp. 6 pp. vol. 3, Oct. 6-9, 2002.*

* cited by examiner

METHOD FOR IDENTIFYING MULTIPLE MOVING TAGS WITH MULTIPLE READERS

CROSS-REFERENCE(S) TO RELATED APPLICATIONS

The present invention claims priority of Korean Patent Application No(s). 10-2006-0070416 and 10-2007-0069613, filed on Jul. 26, 2006 and Jul. 11, 2007, respectively, which are incorporated herein by reference.

BACKGROUND OF THE INVENTION

1. Field of the Invention

The present invention relates to identification of multiple tags, and more Particularly to a method for efficiently identifying a plurality of moving tags with a plurality of readers.

2. Description of Related Art

Radio Frequency Identification (RFID) technology has made a rapid development since 2000. Particularly, passive RFID technology of an ultrahigh frequency (UHF) band stands in the limelight in a distribution market.

An RFID tag is attached onto an object to be recognized, and an RFID reader identifies information included in the tag. The tag information identified by the RFID reader is transmitted to a server and processed in real-time. Thus, a tag identification rate and tag reading speed of an RFID reader are significant criterion of performance.

When a plurality of RFID readers operate in a small area, the performance of the RFID readers is deteriorated due to interference among the RFID readers and repeated identification of a tag by multiple RFID readers. Also, when an object with multiple tags attached thereto is moving at a predetermined speed, the tag identification rate and tag reading speed of an RFID reader are decreased because there is a limit in the number of tags a single RFID reader can identify and the time that moving tags stay in the reading area of the RFID reader.

Therefore, it is required to develop a method for identifying multiple tags to improve tag identification rate and tag reading speed of an RFID system and increase the throughput of the RFID system by efficiently identifying a plurality of moving tags.

SUMMARY OF THE INVENTION

An embodiment of the present invention is directed to providing a multiple tag identifying method that can improve a tag identification rate and tag reading speed of an RFID system, increase the throughput of the RFID system, and efficiently identify a plurality of moving tags by dividing the moving tags moving at a predetermined speed into a predetermined number of tag groups and allocating each of the tag groups to each of the RFID readers for identification.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for identifying a plurality of moving tags by using a plurality of Radio Frequency Identification (RFID) readers, the method which includes the steps of: a) grouping the multiple tags into a predetermined number of tag groups; b) allocating the tag groups to the RFID readers respectively; and c) identifying the tags of each tag group in each RFID reader.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
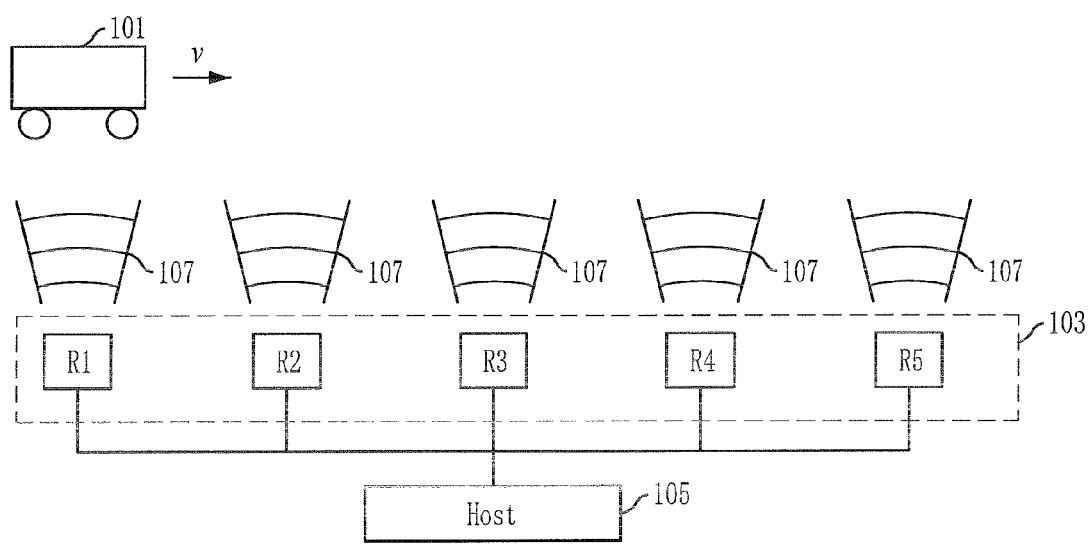
FIG. 1 illustrates a multiple tag identification method in accordance with an embodiment of the present invention.

FIG. 1 illustrates a multiple tag identification method in accordance with an embodiment of the present invention. According to the embodiment, Radio Frequency Identification (RFID) readers R1 to R5 103 capable of identifying multiple tags attached to a mobile object 101 are connected to a host 105. Although FIG. 1 exemplary shows five RFID readers, the present invention is not limited to the number of the RFID readers.

The mobile object 101 with tags attached thereto moves at a predetermined speed, and the RFID readers 103 are disposed sequentially in a direction that the mobile object 101 with the tags moves. Each of the multiple RFID readers 103 has an operation sequence according to the sequential disposition.

The RFID readers 103 identify tags within a reading area 107 and estimate the number of the tags. The host 105 manages information on the RFID readers, such as the number of available RFID readers, disposition of the RFID readers, and identification capability of the RFID readers. The host 105 receives a tag identification result (whether tag is successfully identified or not), a tag identifier, and the estimated number of tags from the RFID readers 103 in real-time and transmits information needed for tag identification to the RFID readers 103 based on the information transmitted from the RFID readers 103.

Herein, the information needed for an RFID reader to identify tags is related to parameters of an RFID reader-tag air protocol. The RFID reader-tag air protocol may be International Organization for Standardization (ISO)/International Electrotechnical Commission (IEC) 18000-6c but the present invention is not limited to it.

Figure 2:
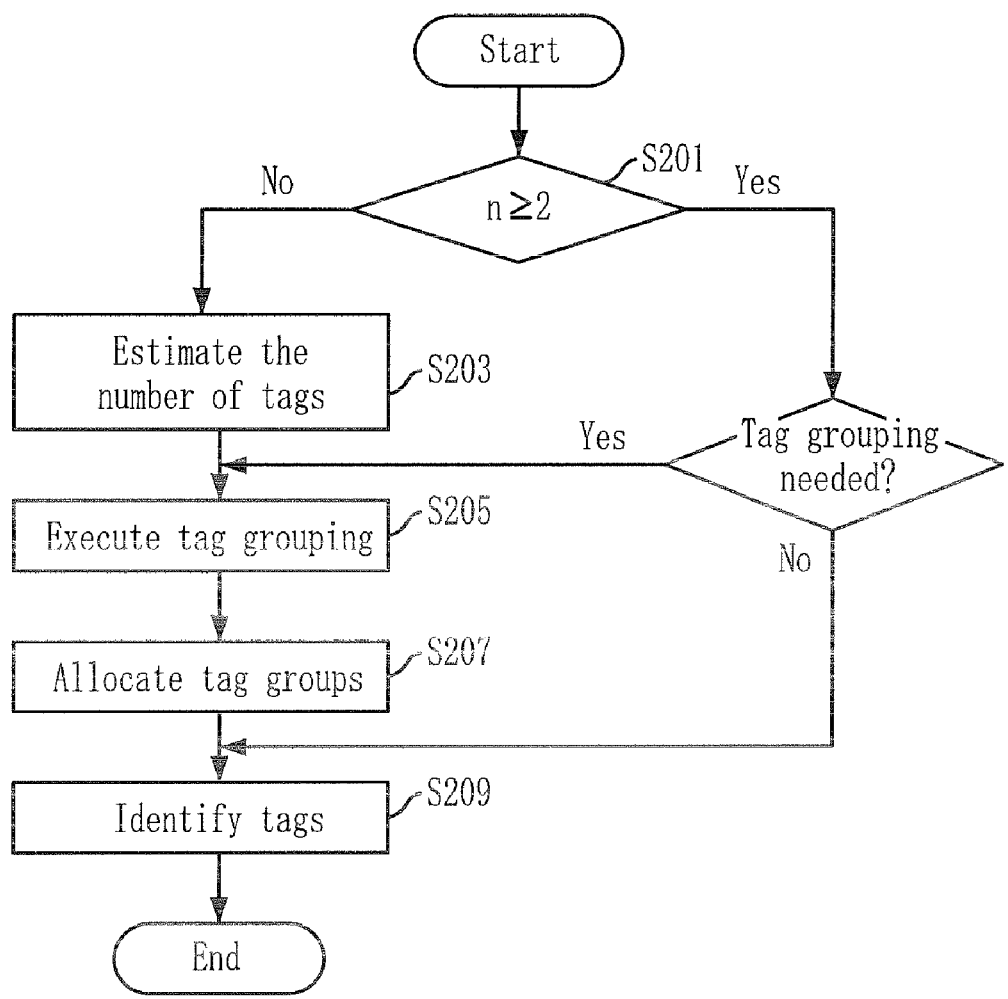
FIG. 2 is a flowchart describing a multiple tag identification method in accordance with an embodiment of the present invention.

FIG. 2 is a flowchart describing a multiple tag identification method in accordance with an embodiment of the present invention. Referring to FIG. 2, the host 105 determines whether an RFID reader to identify tags is the first RFID reader and transmits the determination result to the other RFID readers in step S201. In FIG. 2, n denotes a sequence allocated to each of the multiple RFID readers shown in FIG. 1.

When the RFID reader to identify tags is the first RFID reader R1, the RFID reader R1 estimates the number of tags and transmits the tag number to the host 105 in step S203. The estimation of the number of tags may be carried out based on a slotted-ALOHA-based probability algorithm but the present invention is not limited to it. The step S203 is optional. Thus, when it does not have to estimate the number of tags, for example, when the number of mobile tags is fixed or the number of tags to be identified is predetermined, the step S203 is skipped over.

When the number of tags to be identified is estimated based on the slotted-ALOHA-based probability algorithm, for example, when z tags communicate with an RFID reader through N slots, the probability that r tags exist in one slot follows binomial distribution, which can be expressed as the following Equation 1.

$$B_{z,\frac{1}{N}}(r) = \binom{z}{r}\left(\frac{1}{N}\right)^r\left(1-\frac{1}{N}\right)^{z-r} \qquad \text{Eq. 1}$$

Thus, the average number of tags to be read for one frame or round can be expressed as the following Equation 2, and the average number of empty slots can be expressed as the following Equation 3.

$$a_1^{N,z} = N \cdot B_{z,\frac{1}{N}}(1) = z\left(1-\frac{1}{N}\right)^{z-1} \qquad \text{Eq. 2}$$

$$a_0^{N,z} = N \cdot B_{z,\frac{1}{N}}(0) = z\left(1-\frac{1}{N}\right)^{z} \qquad \text{Eq. 3}$$

When the Equation 3 is divided by the Equation 2, the following Equation 4 is acquired.

$$a_0^{N,z}/a_1^{N,z} = N\left(1-\frac{1}{N}\right)^z / z\left(1-\frac{1}{N}\right)^{z-1} = z(N-1) \qquad \text{Eq. 4}$$

The Equation 4 can be expressed as the following Equation 5.

$$z = (N-1)/(a_0^{N,z}/a_1^{N,z}) \qquad \text{Eq. 5}$$

In the slotted-ALOHA-based RFID system, the number of tags is estimated by substituting an average expected value $a_0^{N,z}$ of an empty slot with an actual value $c_0$, and an average expected value $a_1^{N,z}$ of an identification slot with $c_1$ in the Equation 5. In short, the number of tags is estimated based on the following Equation 6.

$$z = (N-1)/(c_0/c_1) \qquad \text{Eq. 6}$$

In equation 6, denotes the number of tags, N denotes the number of slots, $c_0$ denotes the actual number of empty slots, and $c_1$ denotes the actual number of identification slots. The actual number $c_0$ of empty slots is a predetermined number which is not 0.

In step S205, the host 105 groups tags by the number of tags estimated in the RFID reader 103. The host 105 determines the number of tag groups to be acquired by grouping the multiple tags. The tags may be grouped in diverse methods. For example, when the tags are grouped into four groups using tag identifiers, a first group is formed of tags having a tag identifier starting with '00,' whereas a second group is formed of tags having a tag identifier starting with '01.' A third group is formed of tags having a tag identifier starting with '10,' whereas a fourth group is formed of tags having a tag identifier starting with '11.' The position of a tag identifier bit does not have a specific limitation, and the tags are equally distributed into each group. Generally, a tag identifier includes a domain code, a manufacturing company code, an item code, and a serial number. When the item and the manufacturing company of objects are the same, the tag identifier is positioned in a bit corresponding to a serial number. When the objects are diverse, the bit for the tag identifier may be determined arbitrarily.

In step S207, the host 105 allocates the tag groups to the RFID readers based on the number of available RFID readers and identification capability of each RFID reader. For example, when the first RFID reader R1 estimates the number of tags, a tag group of '00' is allocated to the second RFID reader R2, and a tag group of '01' is allocated to the third RFID reader R3. A tag group of '10' is allocated to the fourth RFID reader R4, and a tag group of '11' is allocated to the fifth RFID reader R5. Herein, there is no specific limitation in the allocation sequence. When there is a difference in the identification capability of the RFID readers, a plurality of tag groups may be allocated to one RFID reader in consideration of the identification capability. For example, the tag group of '00' and the tag group of '01' may be simultaneously allocated to the RFID reader R2.

The RFID readers 103 identify the tag groups allocated by the host 105 in step S209, and the identification algorithm follows the RFID reader-tag air protocol. Each of the RFID readers 103 R1 to R5 identifies only the tag group allocated to itself when the object 101 with the tags attached thereto pass through the reading area 107 of each RFID reader.

Meanwhile, when it turns out in the step S201 that the operating RFID reader is not the first RFID reader, in step S211, the host 105 determines whether to perform re-grouping based on the tag identification result transmitted from the $(n-1)^{th}$ RFID reader and the number of tags included in the tag group allocated to the $n^{th}$ RFID reader in step S211.

When the $(n-1)^{th}$ RFID reader identifies all the tags of the tag group allocated thereto, it does not have to perform re-grouping. When not all the tags of the allocated tag group are identified, re-grouping is needed.

Also, when the number of tags included in the tag group allocated to the $n^{th}$ RFID reader does not exceed the number of tags that the $n^{th}$ RFID reader can identify, the re-grouping is not needed. However, when the number of tags included in the tag group allocated to the $n^{th}$ RFID reader exceeds the number of tags that the $n^{th}$ RFID reader can identify, the re-grouping is needed.

Therefore, when the re-grouping is not needed, the $n^{th}$ RFID reader identifies only the tag group that is already allocated thereto in step S209. When the re-grouping is needed, that is, when the $(n-1)^{th}$ RFID reader fails to identify all the tags in the tag group allocated thereto or when the number of tags included in the tag group allocated to the $n^{th}$ RFID reader exceeds the number of tags that the $n^{th}$ RFID reader can identify, the host 105 performs re-grouping in the step S205, and re-allocates the tag groups in the step S207. Then, the $n^{th}$ RFID reader identifies a tag group that is newly allocated thereto in the step S209.

Table 1 shows an operation example of the multiple tag identification method according to the present invention. Table 1 shows an example in which five RFID readers identify 80 tags, and it is assumed that each RFID reader can identify up to 25 tags. As shown in FIG. 1, the host groups 80 tags estimated by the first RFID reader R1 into four tag groups '00', '01', '10' and '11' each of which includes 20 tags. The tag groups '00', '01', '10' and '11' are allocated to the second RFID reader R2, the third RFID reader R3, the fourth RFID reader R4, and the fifth reader R5, respectively. The tags of the four tag groups '00', '01', '10' and '11' are identified by the second to fifth RFID readers R2, R3, R4 and R5, respectively.

TABLE 1

| | RFID reader | | | | | | |
|---|---|---|---|---|---|---|---|
| | R1 | R2 | R3 | R4 | R5 | R6 | R7 |
| Object with tags passes by R1 | 80 tags are estimated (S203) | '00' tag group is allocated (S205, S207) | '01' tag group is allocated (S205, S207) | '10' tag group is allocated (S205, S207) | '11' tag group is allocated (S205, S207) | | |
| Object with tags passes by R2 | | 20 tags are identified (S211, S209) | | | | | |
| Object with tags passes by R3 | | | 20 tags are identified (S211, S209) | | | | |
| Object with tags passes by R4 | | | | 20 tags are identified (S211, S209) | | | |
| Object with tags passes by R5 | | | | | 20 tags are identified (S211, S209) | | |

Table 2 shows another operation example of the multiple tag identification method according to the present invention. Table 2 shows an example in which seven RFID readers identify 80 tags, and it is assumed that each RFID reader can identify up to 25 tags. As shown in FIG. 2, the host groups 80 tags estimated by the first RFID reader R1 into four tag groups '00', '01', '10' and '11' which include 35 tags, 15 tags, 15 tags, and 15 tags, respectively. The tag groups '00', '01', '10' and '11' are allocated to the second RFID reader R2, the third reader R3, the fourth RFID reader R4, and the fifth reader R5, respectively. Herein, when not all the tags of the '00' tag group are identified because there are 35 tags in the '00' tag group, the host re-groups the '00' tag group into a '000' tag group and a '001' tag group and allocates them into sixth RFID reader R6 and the seventh RFID reader R7, respectively. The '01' '10' and '11' tag groups are identified by the third to fifth RFID readers R3, R4 and R5, respectively, whereas the '000' and '001' tag groups are identified by the RFID reader R6 and the RFID reader R7, respectively.

TABLE 2

| | RFID reader | | | | | | |
|---|---|---|---|---|---|---|---|
| | R1 | R2 | R3 | R4 | R5 | R6 | R7 |
| Object with tags passes by R1 | 80 tags are estimated (S203) | '00' tag group is allocated (S205, S207) | '01' tag group is allocated (S205, S207) | '10' tag group is allocated (S205, S207) | '11' tag group is allocated (S205, S207) | | |
| Object with tags passes by R2 | | There are 35 tags. Unidentified tags are present. Re-Grouped (S211, S209) | Present allocation is maintained (S211, S209) | Present allocation is maintained (S211, S209) | Present allocation is maintained (S211, S209) | '000' tag group is allocated (S211, S205, S207) | '001' tag group is allocated (S211, S205, S207) |
| Object with tags passes by R3 | | | 15 tags are identified (S211, S209) | | | | |
| Object with tags passes by R4 | | | | 15 tags are identified (S211, S209) | | | |
| Object with tags passes by R5 | | | | | 15 tags are identified (S211, S209) | | |
| Object with tags passes by R6 | | | | | | 20 tags are identified (S211, S209) | |

TABLE 2-continued

| | RFID reader | | | | | | |
|---|---|---|---|---|---|---|---|
| | R1 | R2 | R3 | R4 | R5 | R6 | R7 |
| Object with tags passes by R7 | | | | | | | 20 tags are identified (S211, S209) |

As described above, when the second RFID reader R2 fails in identifying tags, the tags are re-grouped into the '000' tag group and the '001' tag group before the third RFID reader R3 operates. According to another operation example, the '000' tag group and the '001' tag group may be allocated to the third RFID reader R3 and the fourth RFID reader R4, respectively, and the existing '01', '10' and '11' tag groups may be allocated to the fifth to seventh RFID readers R5, R6 and R7, respectively.

Table 3 shows yet another operation example of the multiple tag identification method according to the present invention. Table 3 shows an example in which six RFID readers identify 80 tags, and it is assumed that each RFID reader can identify up to 25 tags. As shown in Table 3, the host groups 80 tags estimated by the first RFID reader R1 into four tag groups '00', '01', '10' and '11' which include 15 tags, 15 tags, 10 tags, and 40 tags, respectively. The '00', '01', '10' and '11' tag groups are allocated to the second RFID reader R2, the third reader R3, the fourth RFID reader R4, and the fifth reader R5, respectively. Herein, when the fourth RFID reader R4 identifies 10 tags and a total of 40 tags are identified among the entire 80 tags, the host re-groups 40 tags included in the '11' tag group into a '110' tag group and a '111' tag group each including 20 tags, individually, and allocates them into fifth RFID reader R5 and sixth RFID reader R6, respectively. The '00', '01' and '10' tag groups are identified by the second RFID reader R2, third RFID reader R3, and fourth RFID reader R4, respectively, whereas the '110' and '111' tag groups are identified by the fifth RFID reader R5 and sixth RFID reader R6, respectively.

TABLE 3

| | RFID reader | | | | | | |
|---|---|---|---|---|---|---|---|
| | R1 | R2 | R3 | R4 | R5 | R6 | R7 |
| Object with tags passes by R1 | 80 tags are estimated (S203) | '00' tag group is allocated (S205, S207) | '01' tag group is allocated (S205, S207) | '10' tag group is allocated (S205, S207) | '11' tag group is allocated (S205, S207) | | |
| Object with tags passes by R2 | | 15 tags are identified (S211, S209) | | | | | |
| Object with tags passes by R3 | | | 15 tags are identified (S211, S209) | | | | |
| Object with tags passes by R4 | | | | 10 tags are identified (S211, S209) | '000' tag group is allocated (S211, S205, S207) | '001' tag group is allocated (S211, S205, S207) | |
| Object with tags passes by R5 | | | | | 20 tags are identified (S211, S209) | | |
| Object with tags passes by R6 | | | | | | 20 tags are identified (S211, S209) | |

As described above, whether to re-group the tags in the $n^{th}$ RFID reader is determined based on the tag identification result of the step S209 in the $(n-1)^{th}$ RFID reader, that is, the estimation result or identification result in the S209. When the number of tags included in an actual tag group exceeds the identification capability of an RFID reader and the $(n-1)^{th}$ RFID reader fails to identify all the tags of the tag group, the host re-groups the tags in the steps S205 and S207 before the $n^{th}$ RFID reader operates in the step S209, and determines the number of tags for a tag group based on the number of tags estimated in the $(n-1)^{th}$ RFID reader in the steps S205 and S207. Also, when the $(n-1)^{th}$ RFID reader successfully identifies tags but the $n^{th}$ RFID reader does not identifies all the tags of a tag group allocated thereto, tags are re-grouped before the operation of the $(n+1)^{th}$ RFID reader.

Table 4 shows a still another operation example of the multiple tag identification method according to the present invention. When objects with tags attached thereto passes by RFID readers at a predetermined time intervals, each of the RFID readers operates as follows.

TABLE 4

|  | Reader R1 | Reader R2 | Reader R3 | Reader R4 | Reader R5 |
|---|---|---|---|---|---|
| 1st object passes by R1 | The number of tags of 1st object is estimated | | | | |
| 2nd object passes by R1 | The number of tags of 2nd object is estimated | Tags of 1st object are identified | | | |
| 3rd object passes by R1 | The number of tags of 3rd object is estimated | Tags of 2nd object are identified | Tags of 1st object are identified | | |
| 4th object passes by R1 | The number of tags of 4th object is estimated | Tags of 3rd object are identified | Tags of 2nd object are identified | Tags of 1st object are identified | |
| 5th object passes by R1 | The number of tags of 5th object is estimated | Tags of 4th object are identified | Tags of 3rd object are identified | Tags of 2nd object are identified | Tags of 1st object are identified |
| 6th object passes by R1 | The number of tags of 6th object is estimated | Tags of 5th object are identified | Tags of 4th object are identified | Tags of 3rd object are identified | Tags of 2nd object are identified |
| 7th object passes by R1 | The number of tags of 7th object is estimated | Tags of 6th object are identified | Tags of 5th object are identified | Tags of 4th object are identified | Tags of 3rd object are identified |
| 8th object passes by R1 | The number of tags of 8th object is estimated | Tags of 7th object are identified | Tags of 6th object are identified | Tags of 5th object are identified | Tags of 4th object are identified |
| 9th object passes by R1 | The number of tags of 9th object is estimated | Tags of 8th object are identified | Tags of 7th object are identified | Tags of 6th object are identified | Tags of 5th object are identified |

As described above, when objects with tags attached thereto continue to pass by the RFID readers at a predetermined time interval, the first RFID reader R1 estimates the number of tags attached to each object, and each of the RFID readers R2 to R5 identifies tags of a tag group allocated thereto, when the object of the tag group passes the reading area of the RFID reader. The RFID readers operate in a pipelined architecture.

Herein, the pipelined architecture is a method of dividing one processor into a plurality of sub-processors having different functions and capable of processing different data simultaneously.

The multiple tag identification method of the present invention improves a tag identification rate and tag reading speed of an RFID system, which may increase the throughput of the RFID system. The method of the present invention can be applied to diverse areas capable of adopting the RFID technology.

As described above, the method of the present invention can be realized as a program and stored in a computer-readable recording medium such as CD-ROM, RAM, ROM, floppy disks, hard disks, and magneto-optical disks. Since the process can be easily implemented by those of ordinary skill in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A method for identifying a plurality of moving multiple tags by using a plurality of Radio Frequency Identification (RFID) readers, comprising:
    a) grouping the multiple tags into a predetermined number of tag groups based on a number of the multiple tags;
    b) allocating the tag groups to the RFID readers respectively based on a number of the RFID readers and identification capability of each RFID reader; and
    c) identifying tags of each allocated tag group in each RFID reader,
    wherein the RFID readers sequentially operate according to an operation sequence,
    wherein the step c) includes the steps of:
        c1) determining whether a tag group acquired in the step b) needs to be re-grouped based on the number of unidentified tags among the multiple tags;
        c2) when re-grouping is needed, re-grouping the unidentified tags into groups having a predetermined number of tags;
        c3) respectively allocating the tag groups acquired from the re-grouping in the step c2) to RFID readers that are not operated yet among the plurality of RFID readers; and
        c4) identifying tags of the tag groups allocated in the step c3) sequentially according to the operation sequence in the RFID readers that are not operated yet.

2. The method of claim 1, wherein whether to execute the re-grouping is determined based on whether all tags of a tag group allocated to a previous RFID reader are identified in the step c1).

3. The method of claim 1, wherein whether to execute the re-grouping is determined based on whether the number of tags included in a currently operating RFID reader exceeds the identification capability of the RFID reader in the step c1).

4. The method of claim 1, wherein the step a) includes the steps of:
- a1) estimating the number of the multiple tags is estimated; wherein the step a) groups the multiple tags into tag groups having a predetermined number of tags.

5. The method of claim 4, wherein the step a1) estimates the number of the multiple tags based on an equation expressed as:

$z=(N-1)/(c_0/c_1)$ where z denotes the number of the multiple tags; N denotes a number of slots using to communicate the multiple tags with the RFID readers; c0 denotes an actual number of empty slots; and c1 denotes an actual number of identification slots, and the actual number c0 of empty slots is a predetermined number which is not 0.

6. The method of claim 4, wherein the step a1) is executed when the first RFID reader is an RFID reader that is in operation.

* * * * *